(12) United States Patent
Abughazaleh et al.

(10) Patent No.: US 8,540,897 B1
(45) Date of Patent: Sep. 24, 2013

(54) WATER QUENCH FOR GASIFIER

(75) Inventors: John Abughazaleh, Sugar Land, TX (US); Peter Van Smith, Fulshear, TX (US); Richard B. Strait, Porter, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 0 days.

(21) Appl. No.: 13/459,897

(22) Filed: Apr. 30, 2012

(51) Int. Cl.
*C01B 3/34* (2006.01)
*B01J 10/00* (2006.01)

(52) U.S. Cl.
USPC .......................................... 252/373; 422/193

(58) Field of Classification Search
None
See application file for complete search history.

(56) References Cited

U.S. PATENT DOCUMENTS

| | | | |
|---|---|---|---|
| 7,402,188 B2 | 7/2008 | Sprouse | |
| 7,503,945 B2 | 3/2009 | Hiltunen et al. | |
| 7,740,672 B2 | 6/2010 | Sprouse | |
| 7,947,095 B2 | 5/2011 | Palonen et al. | |
| 2008/0289254 A1 | 11/2008 | Sprouse | |
| 2010/0090166 A1* | 4/2010 | Fournier et al. | 252/373 |
| 2010/0148122 A1* | 6/2010 | Breton et al. | 252/373 |
| 2010/0324156 A1 | 12/2010 | Winter et al. | |
| 2011/0173885 A1 | 7/2011 | Davey et al. | |
| 2011/0210292 A1 | 9/2011 | Ariyapadi | |
| 2011/0250662 A1* | 10/2011 | Sutradhar et al. | 435/157 |

* cited by examiner

*Primary Examiner* — Melvin C Mayes
*Assistant Examiner* — Douglas Call
(74) *Attorney, Agent, or Firm* — Gary M. Machetta

(57) ABSTRACT

Systems and methods for gasifying a feedstock are provided. A feedstock can be introduced to a riser. A first oxidant can be introduced to a first mixing zone within the riser, thereby generating a first high temperature zone within the first mixing zone proximate an entry point of the first oxidant. A first stream of water can be introduced to the first high temperature zone to reduce the temperature therein. A second oxidant can be introduced to a second mixing zone within the riser, thereby generating a second high temperature zone within the second mixing zone proximate an entry point of the second oxidant. A second stream of water can be introduced to the second high temperature zone to reduce the temperature therein. The feedstock and the first and second oxidants can be gasified in a gasification zone within the riser.

9 Claims, 2 Drawing Sheets

US 8,540,897 B1

WATER QUENCH FOR GASIFIER

BACKGROUND

1. Field

Embodiments described herein generally relate to a gasifier and methods for operating the gasifier. More particularly, such embodiments relate to reducing the temperature within the gasifier at one or more locations where oxidant is introduced thereto.

2. Description of the Related Art

Gasification is a high-temperature process that converts carbon-containing feedstocks into mostly gaseous mixtures, including carbon monoxide, carbon dioxide, and hydrogen. The gaseous product is typically referred to as synthesis gas or, more succinctly, syngas. Syngas can be used as a source of hydrogen, for the production of other organic chemicals, and/or to generate steam and/or electricity. Thus, gasification adds value to otherwise low-value feedstocks by converting them to marketable products.

Gasifiers include a riser configured to convert a feedstock and an oxidant into syngas. Heat is generated at the point where the oxidant enters the riser. This generated heat causes a localized hot zone or region having a temperature that can result in structural stresses within the gasifier. To reduce the temperature at the oxidant entry point steam is oftentimes introduced at the entry point with the oxidant, either mixed with the oxidant or independent the oxidant. Due to the already high temperature, e.g., above 100° C., the cooling effects of the steam are limited.

Ash circulating within the riser can also reduce the temperature at the oxidant entry point via heat absorption. When the ash absorbs this additional heat, however, the ash tends to soften, and as the ash softens, it can agglomerate and cause blockages or obstructions within the gasifier.

There is a need, therefore, for improved systems and methods for reducing the temperature at localized hot zones within a gasifier.

DETAILED DESCRIPTION

Figure 1:
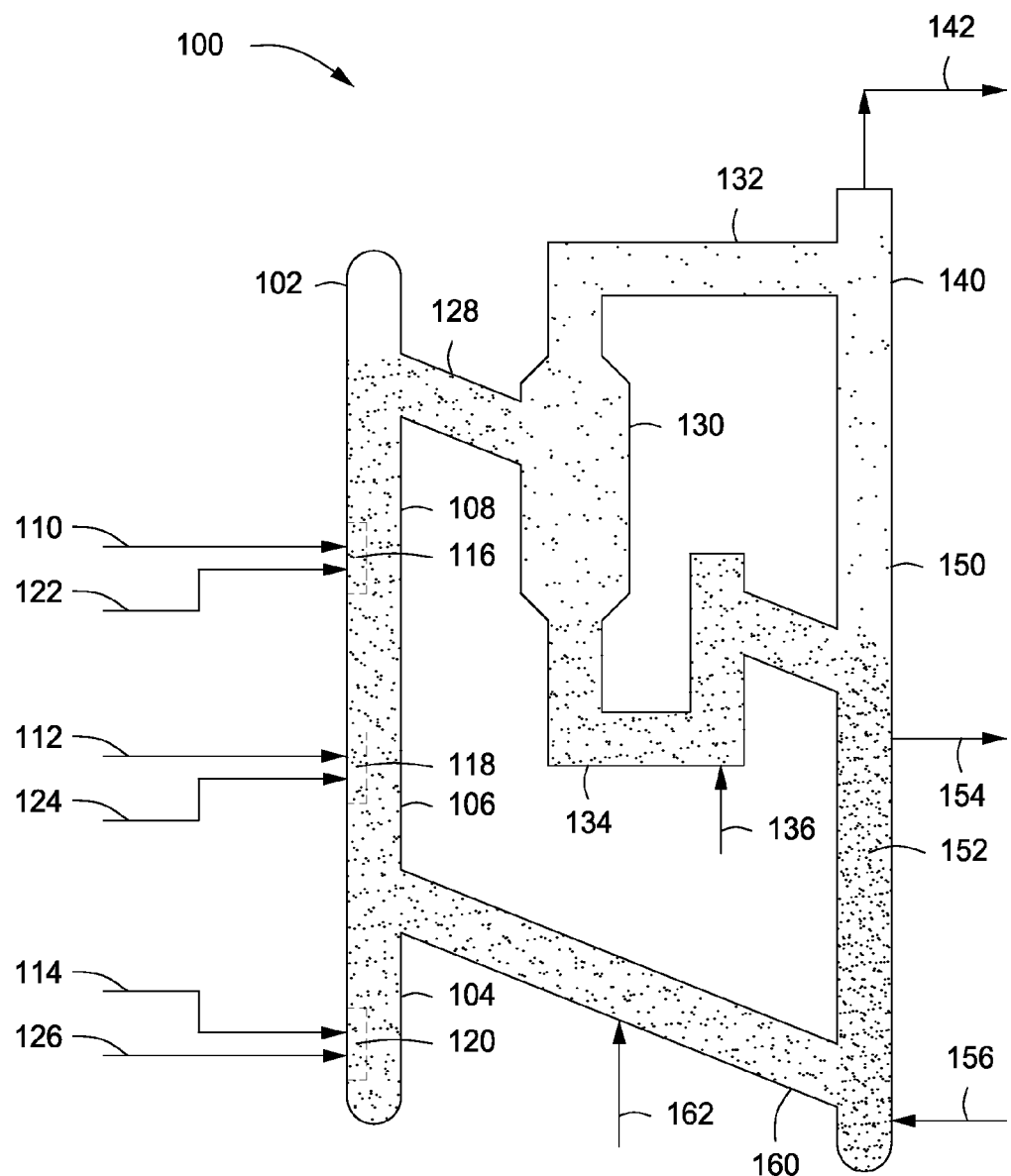
FIG. 1 depicts an illustrative gasifier, according to one or more embodiments described.

FIG. 1 depicts an illustrative gasifier 100, according to one or more embodiments. The gasifier 100 can include a riser 102, a first separator, e.g., a first cyclone, 130, a second separator, e.g., a second cyclone 140, a standpipe 150, and a recycle line 160. The riser 102 can include a first or "lower" mixing zone 104, a second or "upper" mixing zone 106, and a gasification zone 108. One or more feedstocks (one is shown) via line 110 can be introduced to the first mixing zone 104, the second mixing zone 106, and/or the gasification zone 108. For example, the feedstock via line 110 can be introduced to the gasification zone 108, as shown in FIG. 1. Similarly, one or more oxidants (two are shown) via lines 112, 114 can be introduced to the first mixing zone 104, the second mixing zone 106, and/or the gasification zone 108. For example, the oxidant via line 112 can be introduced to the second mixing zone 106, and the oxidant via line 114 can be introduced to the first mixing zone 104. The feedstock via line 110 and oxidants via lines 112, 114 can be introduced separately into the gasifier 100, as shown, and/or introduced as a mixture (not shown). The feedstock via line 110 and oxidants via lines 112, 114 can be introduced sequentially and/or simultaneously into the gasifier 100.

Heat can be generated within a localized area, region, volume, or zone ("first high temperature zone") 120 proximate an entry point of the oxidant via line 114 into the first mixing zone 104. For example, the heat within the localized zone 120 can be generated, at least in part, by the combustion of at least a portion of the feedstock introduced via line 110 and/or the combustion of at least a portion of carbon deposited on circulating particulates introduced to the riser 102 from a particulate or solids bed 152. The term "entry point" can refer to or include the locations where the lines 110, 112, 114, containing the feedstock and/or oxidant, intersect the riser 102. The temperature in the localized zone 120 can range from a low of 1,000° C., about 1,050° C., about 1,100° C., or about 1,150° C. to a high of about 1,200° C., about 1,250° C., about 1,300° C., about 1,350° C., or about 1,400° C.

Heat can also be generated within a localized area, region, volume, or zone ("second high temperature zone") 118 proximate an entry point of the oxidant via line 112 into the second mixing zone 106. For example, the heat within the localized zone 118 can be generated, at least in part, by the combustion of at least a portion of the feedstock introduced via line 110 and/or the combustion of at least a portion of the carbon deposited on circulating particulates introduced to the riser 102 from the particulate or solids bed 152. The temperature in the localized zone 118 can range from a low of about 900° C., about 950° C., or about 1,000° C. to a high of about 1,100° C., about 1,200° C., or about 1,300° C.

Heat can also be generated within a localized area, region, volume, or zone ("third high temperature zone) 116 proximate an entry point of the feedstock via line 110 into the riser 102. For example, the heat within the localized zone 116 can be generated, at least in part, by the combustion of at least a portion of the feedstock introduced via line 110 and/or the combustion of at least a portion of carbon deposited on circulating particulates introduced to the riser 102 from the particulate or solids bed 152. The temperature in the localized zone 116 can range from a low of about 800° C., about 850° C., or about 900° C. to a high of about 1,000° C., about 1,100° C., or about 1,200° C.

In at least one embodiment, the zones 116, 118, 120 can have a cross-sectional area (width×height) corresponding to the cross-sectional area of the inlet line 110, 112, 114. For example, the cross-sectional area can range from a low of about 5 cm$^2$, about 10 cm$^2$, about 20 cm$^2$, about 40 cm$^2$, about 60 cm$^2$, or about 80 cm$^2$ to a high of about 100 cm$^2$, about 200 cm$^2$, about 400 cm$^2$, about 600 cm$^2$, about 800 cm$^2$, about 1,000 cm$^2$ or more depending on the size of the riser 102 and/or gasifier 100. In another example, the cross-sectional area can rage from a low of about 0.001 m$^2$, about 0.01 m$^2$, about 0.1 m$^2$, or about 0.5 m$^2$ to a high of about 1 m$^2$, about 3 m$^2$, about 5 m$^2$, about 7 m$^2$ or more, depending at least in part on the size of the riser 102 and/or gasifier 100. The zones 116, 118, 120 can also have a depth into the riser 102 from the lines 110, 112, 114, thus creating a volume. For example, the depth can range from a low of about 1 cm, about 2 cm, about 4 cm, about 6 cm, about 8 cm, or about 10 cm to a high about 20 cm, about 40 cm, about 60 cm, about 80 cm, about 100 cm, about 150 cm, about 200 cm or more depending on the size of the riser 102.

To at least partially reduce, prevent, negate, inhibit, or otherwise counteract the heat generated in the localized zones ("high temperature zones") 116, 118, 120 formed or caused, at least in part, by the introduction of the feedstock via line 110 and/or the oxidant via lines 112, 114, water via lines 122, 124, 124 can be introduced into the zones 116, 118, 120, respectively. At least a portion of the water can be vaporized upon entry into the riser 102, and the latent heat of vaporization of the water can be utilized to at least partially quench or reduce the temperature within zones 116, 118, 120. Said another way, the energy or heat required to at least partially vaporize a portion of the water introduced via lines 122, 124, 126 can be supplied by the heat generated in the localized zones 116, 118, 120, thus reducing the amount of heat available for increasing the temperature of the gasifier in the localized zones 116, 118, 120.

More particularly, the water via line 126 ("first stream of water") can be introduced into the zone 120 where the oxidant via line 114 ("first oxidant") is introduced. The water via line 126 can be injected, sprayed, or atomized into the zone 120 separately from the oxidant via line 114, or the water via line 126 can be injected, sprayed, or atomized into the oxidant via line 114 just prior to entry into the zone 120.

Similarly, water via line 124 ("second stream of water") can be introduced into the zone 118 where the oxidant via line 112 ("second oxidant") is introduced. The water via line 124 can be injected, sprayed, or atomized into the zone 118 separately from the oxidant via line 112, or the water via line 124 can be injected, sprayed, or atomized into the oxidant via line 112 just prior to entry into the zone 118.

Similarly, the water via line 122 ("third stream of water") can be introduced into the zone 116 where the feedstock via line 110 is introduced. The water via line 122 can be injected, sprayed, or atomized into the zone 116 separately from the feedstock via line 110, or the water via line 122 can be injected, sprayed, or atomized into the feedstock via line 110 just prior to entry into the zone 116.

The heat generated within the localized zones 120, 118, and/or 116 can be sufficient enough to cause a temperature spike, peak, or other increase relative to other regions or zones within the gasifier, e.g., the sections between the first and second mixing zones 104, 106, the second mixing zone 106 and the gasification zone 108, that are outside the localized zones 120, 118, and/or 116. In other words, the introduction of the water via lines 126, 124, and/or 122 can reduce and/or eliminate the increase in temperature within the localized zones 120, 118, and/or 116, respectively, as compared to the use of steam instead of water. The temperature within the localized zones 120, 118, and/or 116 can be maintained at or less than about 200° C., less than about 190° C., less than about 180° C., less than about 170° C., less than about 160° C., less than about 150° C., less than about 140° C., less than about 130° C., less than about 120° C., less than about 110° C., less than about 100° C., less than about 90° C., less than about 80° C., less than about 70° C., less than about 60° C., less than about 50° C., less than about 40° C., less than about 30° C., or less than about 20° C. greater than the temperature in the regions outside the localized zones 120, 118, and/or 116.

For example, the temperature within the first mixing zone surrounding the first localized zone 120 can be about 1,000° C. and the temperature within the first localized zone 120 can be maintained at a temperature ranging anywhere from about 1,000° C. to about 1,200° C. by introducing the water via line 126 thereto. The temperature within the second and third localized zones 118, 116 can also be maintained or controlled in a similar manner. As such, the increase or spike in temperature associated with the introduction of the first oxidant via line 114, the second oxidant via line 112, and/or the feedstock via line 112 can be reduced via the introduction of the water via lines 126, 124, and/or 122.

As used herein, the term "water" can include liquid water and/or ice, e.g., particulate ice. The water via lines 122, 124, 126 can originate from the same source, or the water may originate from different sources. In at least one embodiment, the water can include process condensate, boiler blow down, process stripper bottoms, and the like. The water via lines 122, 124, 126 can be at a temperature ranging from a low of about 1° C., about 10° C., about 20° C., about 30° C., about 40° C., about 50° C., about 60° C., about 80° C., about 100° C., about 120° C., or about 140° C. to a high of about 180° C., about 200° C., about 220° C., about 240° C., or about 260° C. For example, the temperature of the water via lines 122, 124, 126 can range from about 80° C. to about 260° C., about 100° C. to about 220° C., or about 120° C. to about 180° C. The temperature of the water via lines 122, 124, 126 can also range from about 90° C. to about 120° C., or about 90° C. to about 110° C.

The water via lines 122, 124, 126 can be at a pressure ranging from a low of about 3,000 kPa, about 3,200 kPa, about 3,400 kPa, about 3,600 kPa, about 3,800 kPa, or about 4,000 kPa to a high of about 4,200 kPa, about 4,400 kPa, about 4,600 kPa, about 4,800 kPa, about 5,000 kPa, about 6,000 kPa or about 7,000 kPa. For example, the pressure of the water in lines 122, 124, 126 can range from about 3,500 kPa to about 5,500 kPa, about 3,700 kPa to about 5,000 kPa, about 3,900 kPa to about 4.500 kPa, or about 4,000 kPa to about 4,300 kPa.

Each stream of water via lines 122, 124, 126 can be introduced into the zones 116, 118, 120 of the riser 102 at a flow rate ranging from a low of about 10 kg/hr, 50 kg/hr, about 100 kg/hr, about 200 kg/hr, about 300 kg/hr, about 400 kg/hr, or about 500 kg/hr to a high of about 1,000 kg/hr, about 2,000 kg/hr, about 3,000 kg/hr, about 4,000 kg/hr, about 5,000 kg/hr, about 7.500 kg/hr, about 10,000 kg/hr, about 15,000 kg/hr, or more. The flow rate of the water in line 122 can depend, at least in part, on the type/composition of the feedstock via line 110, the flow rate of the feedstock via line 110, the flow rate of any other cooling fluid, e.g., steam, being introduced to the zone 116, the temperature of the other cooling fluid being introduced to the zone 116, the temperature within the zone 116, and the like. In at least one embodiment, the flow rate of the water in line 122 can range from a low of about 10 kg/hr, about 100 kg/hr, about 500 kg/hr, or about 1,000 kg/hr to a high of about 3,000 kg/hr, about 4,000 kg/hr, or about 5,000 kg/hr. For example, the flow rate of the water in line 122 can be between about 100 kg/hr and about 500 kg/hr, about 500 kg/hr and about 1,000 kg/hr, about 1,000 kg/hr and about 2,000 kg/hr, or about 2,000 kg/hr and about 5,000 kg/hr.

The flow rate of the water in line 124 can depend, at least in part, on the composition of the oxidant via line 112, the flow rate of the oxidant via line 112, the flow rate of any other cooling fluid, e.g., steam, being introduced to the zone 118, the temperature of the other cooling fluid being introduced to the zone 118, the temperature within the zone 118, and the like. In at least one embodiment, the flow rate of the water in line 124 can range from a low of about 10 kg/hr, about 100 kg/hr, about 500 kg/hr, or about 1,000 kg/hr to a high of about 5,000 kg/hr, about 7,500 kg/hr, or about 10,000 kg/hr. For example, the flow rate of the water in line 124 can be between about 100 kg/hr and about 500 kg/hr, about 500 kg/hr and about 1,000 kg/hr, about 1,000 kg/hr and about 2,000 kg/hr, about 2,000 kg/hr and about 5,000 kg/hr, or about 5,000 kg/hr and about 10,000 kg/hr.

The flow rate of the water in line 126 can depend, at least in part, on the composition of the oxidant via line 114, the flow rate of the oxidant via line 114, the flow rate of any other cooling fluid, e.g., steam, being introduced to the zone 120, the temperature of the other cooling fluid being introduced to the zone 120, the temperature within the zone 120, and the like. In at least one embodiment, the flow rate of the water in line 126 can range from a low of about 10 kg/hr, about 100 kg/hr, about 500 kg/hr, or about 1,000 kg/hr to a high of about 5,000 kg/hr, about 7,500 kg/hr, about 10,000 kg/hr, or about 15,000 kg/hr. For example, the flow rate of the water in line 126 can be between about 100 kg/hr and about 500 kg/hr, about 500 kg/hr and about 1,000 kg/hr, about 1,000 kg/hr and about 2,000 kg/hr, about 2,000 kg/hr and about 5,000 kg/hr, about 5,000 kg/hr and about 10,000 kg/hr, or about 10,000 kg/hr and about 15,000 kg/hr. Accordingly, the flow rates within lines 122, 124, 126 can be the same, or they can be different. Further, the flow rates within the lines 122, 124, 126 can be continuous or vary over time.

The flow rate of water into each zone 116, 118, 120 can depend, at least in part, on the likelihood that excessive heat will be generated in the zone 116, 118, 120. For example, the likelihood that excessive heat will be generated in the zone 120 is greater than the likelihood that excessive heat will be generated in the zone 118, and the likelihood that excessive heat will be generated in the zone 118 is greater than the likelihood that excessive heat will be generated in the zone 116. As such, in at least one embodiment, the flow rate of water in line 126 can be greater than the flow rate of water in line 124, and the flow rate of water in line 124 can be greater than the flow rate of water in line 122.

Although not shown, steam can also be introduced to at least one of the zones 104, 106, 108 and/or at least one of the zones 116, 118, 120 at a rate ranging from a low of about 1,000 kg/hr, about 5,000 kg/hr, or about 10,000 kg/hr to a high of about 20,000 kg/hr, about 30,000 kg/hr, about 40,000 kg/hr, or more. For example, the flow rate of the steam can range between about 5,000 kg/hr and about 40,000 kg/hr, about 10,000 kg/hr and about 30,000 kg/hr, or about 15,000 kg/hr and about 25,000 kg/hr.

The use of water for cooling the localized hot zones 116, 118, 120 can provide one or more advantages over conventional steam. For example, the water via lines 122, 124, 126 can provide more cooling (by weight) than steam, as the latent heat of vaporization of the water can be used for the quench, rather than the sensible heat of steam. In another example, high pressure boiler feed water is less expensive than an equivalent amount (by weight) of high pressure steam. As such, significant energy and capital savings can result from reducing the amount of moderating steam being injected into the riser 102 to achieve the same amount of cooling. Furthermore, by using water, the syngas flowing through the gasifier 100 can contain a smaller percentage of steam. This can increase the syngas producing capacity of the gasifier 100 and simultaneously reduce the duty and cost of the downstream syngas cooler and associated components. The use of water may also enable the processing of a feedstock via line 110 having ash with a lower softening point, as water quenching can enable a more effective and faster-responding method of temperature control than steam. The water via lines 122, 124, 126 can be or include raw water, processed water, high pressure boiler feed water, recycle water, combinations thereof; and the like.

As used herein, the term "feedstock" refers to one or more materials, whether solid, liquid, gas, or any combination thereof. For example, the feedstock can include one or more carbonaceous materials. Examples of a suitable carbonaceous materials can include, but are not limited to, biomass (i.e., plant and/or animal matter or plant and/or animal derived matter); coal (high-sodium and low-sodium lignite, lignite, subbituminous, and/or anthracite, for example); oil shale; coke; tar; asphaltenes; low ash or no ash polymers; hydrocarbons, hydrocarbon-based polymeric materials; biomass derived material; or by-product derived from manufacturing operations. Examples of suitable hydrocarbon-based polymeric materials can include, but are not limited to, thermoplastics, elastomers, rubbers, including polypropylenes, polyethylenes, polystyrenes, including other polyolefins, homo polymers, copolymers, block copolymers, and blends thereof; PET (polyethylene terephthalate), poly blends, polyhydrocarbons containing oxygen; heavy hydrocarbon sludge and bottoms products from petroleum refineries and petrochemical plants such as hydrocarbon waxes; blends thereof; derivatives thereof, and combinations thereof.

The feedstock in line 110 can include a mixture or combination of two or more carbonaceous materials (i.e., carbon-containing materia(s). The feedstock in line 110 can include a mixture or combination of two or more low ash or no ash polymers, biomass derived materials, byproducts derived from manufacturing operations, and/or discarded consumer products. For example, the feedstock in line 110 can include one or more carbonaceous materials combined with one or more discarded consumer products such as carpet and/or plastic automotive parts/components including bumpers and dashboards.

The particular type and/or amount of oxidant introduced via lines 112, 114 to the gasifier 100 can influence the composition and/or physical properties of the syngas and hence, the downstream products made therefrom. Illustrative oxidants can include, but are not limited to, air, oxygen, essentially oxygen, oxygen-enriched air, mixtures of oxygen and air, mixtures of oxygen and one or more other gases such as syngas, mixtures of oxygen and one or more inert gases, for example, nitrogen and/or argon. The oxidant in lines 112, 114 can contain about 60 vol % oxygen or more, about 70 vol % oxygen or more, about 80 vol % oxygen or more, about 90 vol % oxygen or more, about 95 vol % oxygen or more, or about 99 vol % volume oxygen or more. As used herein, the term "essentially oxygen" refers to an oxygen stream containing more than 50 vol % oxygen. As used herein, the term "oxygen-enriched air" refers to a gas mixture containing about 21 vol % to 50 vol % oxygen. Oxygen-enriched air and/or essentially oxygen can be obtained, for example, from cryogenic distillation of air, pressure swing adsorption, membrane separation, or any combination thereof. The oxidant in lines 112, 114 can be nitrogen-free or essentially nitrogen-free. As used herein, the term "essentially nitrogen-free" refers to an oxidant that contains about 5 vol % nitrogen or less, about 4 vol % nitrogen or less, about 3 vol % nitrogen or less, about 2 vol % nitrogen or less, or about 1 vol % nitrogen or less.

One or more sorbents (not shown) can optionally be introduced to the gasifier 100. The sorbent can be added to capture contaminants, such as sodium vapor, within the gasifier 100. The sorbent can also be used to dust or coat feedstock and/or ash particles in the gasifier 100 to reduce the tendency for the particles to agglomerate. The sorbent can be ground to an average particle size of about 5 µm to about 100 µm, or about 10 µm to about 75 µm. Examples of suitable sorbents include, but are not limited to, limestone, dolomite, and coke breeze. The feedstock via line 114 and the sorbent can be mixed and fed together, or fed separately, to the gasifier 100. The feedstock via line 110, the oxidants via lines 112, 114, and the optional sorbent can be introduced sequentially or simultaneously.

The pressure within the first mixing zone 104, the second mixing zone 106, and/or the gasification zone 108 can range from a low of about 3,000 kPa, about 3,250 kPa, or about 3,500 kPa to a high of about 4,000 kPa, about 4,500 kPa, or about 5,000 kPa. The temperature within the first, lower mixing zone 104 can range from a low of about 800° C., about 850° C., or about 900° C. to a high of about 1,000° C., about 1,050° C., or about 1,100° C. The temperature within the second, upper mixing zone 106 can range from a low of about 770° C., about 820° C., or about 870° C. to a high of about 970° C., about 1,020° C., or about 1,070° C. The temperature within the gasification zone 108 can range from a low of about 750° C., about 800° C., or about 850° C. to a high of about 950° C., about 1,000° C., or about 1,050° C.

The flow rate of the feedstock via line 110 into the riser 102 can range from a low of about 30,000 kg/hr, about 50,000 kg/hr, or about 70,000, kg/hr to a high of about 140,000 kg/hr, about 170,000 kg/hr, or about 200,000 kg/hr. The flow rate of the oxidant via lines 112, 114 into the riser 102 can range from a low of about 14,000 kg/hr, about 20,000 kg/hr, or about 30,000 kg/hr to a high of about 60,000 kg/hr, about 80,000 kg/hr, or about 100,000 kg/hr. For example the flow rate of the oxidant via line 112 into the riser 102 can range from a low of about 4,000 kg/hr, about 8,000 kg/hr, about 12,000 kg/hr, about 16,000 kg/hr, or about 20,000 kg/hr to a high of about 30,000 kg/hr, about 40,000 kg/hr, about 50,000 kg/hr, about 60,000 kg/hr, or about 70,000 kg/hr. Likewise, the flow rate of the oxidant via line 114 into the riser 102 can range from a low of about 4,000 kg/hr, about 8,000 kg/hr, about 12,000 kg/hr, about 16,000 kg/hr, or about 20,000 kg/hr to a high of about 30,000 kg/hr, about 40,000 kg/hr, about 50,000 kg/hr, about 60,000 kg/hr, or about 70,000 kg/hr.

After being introduced into the riser 102, the feedstock via line 110, the oxidants via lines 112, 114, and the water via lines 122, 124, 126 can be converted into a mixture of syngas and particulates within the riser 102. The syngas/particulate mixture can be recovered from the gasification zone 108 of the riser 102 and introduced to a first disengager or cyclone 130 via a first line or crossover 128. The first cyclone 120 can be configured to separate at least a portion of the particulates from the syngas. The separated syngas ("first syngas stream") can flow out the first cyclone 130 and be introduced to a second cyclone 140 via a second line or crossover 132. The separated particulates ("first particulate stream") can flow out of the first cyclone 130 and be introduced to the standpipe 150 via a transfer line or seal leg 134.

The second cyclone 140 can be configured to separate at least a portion of the remaining particulates from the first syngas stream via line 132. The separated syngas ("second syngas stream") can then flow out of the second cyclone 140 via line 142. The separated particulates ("second particulate stream") can flow out of the second cyclone 140 and be introduced to the standpipe 150 along with the first particulate stream via line 134 from the first cyclone 130. The particulates from the first and second cyclones 130, 140 can accumulate within the standpipe 150 and form the bed of particulates or solids 152 therein. The particulates can be transferred via a recycle line or j-leg 160 from the standpipe 150 to the first mixing zone 104, the second mixing zone 106, and/or the gasification zone 108 of the riser 102. At least a portion of the ash present in the standpipe 150 can be removed via line 154.

The height and/or density of the solids bed 152 within the standpipe 150 can influence the circulation rate of the recycled particulates via line 160. The circulation rate of the recycled particulates via line 160 can be used to control the operating temperature within the gasifier 100. For example, the recycled particulates via line 160 can serve to rapidly heat the incoming feedstock introduced via line 110.

One or more nozzles can introduce fluids into the gasifier 100 to aerate and fluidize the particulates therein so that the particulates continue to circulate throughout the gasifier 100. For example, fluid can be introduced via line 136 into the transfer line 134, via line 156 into the standpipe 150, and via line 162 into the recycle line 160. Illustrative fluids can include, but are not limited to, nitrogen, carbon dioxide, combustion gas products, recycled syngas, any combination thereof, or the like. In at least one embodiment, the fluids can be or include one or more inert gases, e.g., nitrogen. In at least one other embodiment, the fluids can be or include recycled syngas and/or combustion gas products.

The syngas output from the gasifier 100 in line 142 can contain about 85 vol % or more carbon monoxide and hydrogen with the balance being primarily carbon dioxide and methane. The syngas in line 142 can contain about 90 vol % or more carbon monoxide and hydrogen, about 95 vol % or more carbon monoxide and hydrogen, about 97 vol % or more carbon monoxide and hydrogen, or about 99 vol % or more carbon monoxide and hydrogen. The carbon monoxide content of the syngas in line 142 can range from a low of about 10 vol %, about 20 vol %, or about 30 vol % to a high of about 50 vol %, about 70 vol %, or about 85 vol %. The hydrogen content of the syngas in line 142 can range from a low of about 1 vol %, about 5 vol %, or about 10 vol % to a high of about 30 vol %, about 40 vol %, or about 50 vol %.

The syngas in line 142 can contain less than about 25 vol %, less than about 20 vol %, less than about 15 vol %, less than about 10 vol %, or less than about 5 vol % of combined nitrogen, methane, carbon dioxide, water, hydrogen sulfide, and hydrogen chloride. The carbon dioxide content of the syngas in line 142 can be about 25 vol % or less, about 20 vol % or less, about 15 vol % or less, about 10 vol % or less, about 5 vol % or less, about 3 vol % or less, about 2 vol % or less, or about 1 vol % or less. The methane content of the syngas in line 142 can be about 15 vol % or less, about 10 vol % or less, about 5 vol % or less, about 3 vol % or less, about 2 vol % or less, or about 1 vol % or less. The water content of the syngas in line 142 can be about 40 vol % or less, about 30 vol % or less, about 25 vol % or less, about 20 vol % or less, about 15 vol % or less, about 10 vol % or less, about 5 vol % or less, about 3 vol % or less, about 2 vol % or less, or about 1 vol % or less. The syngas in line 142 can be nitrogen-free or essentially nitrogen-free. For example, the syngas in line 142 can contain less than about 3 vol %, less than about 2 vol %, less than about 1 vol %, or less than about 0.5 vol % nitrogen.

The syngas in line 142 can have a heating value, corrected for heat losses and dilution effects, ranging from a low of about 1,863 kJ/m$^3$ (50 Btu/scf), about 2,794 kJ/m$^3$ (75 Btu/scf), about 3,726 kJ/m$^3$ (100 Btu/scf), about 4,098 kJ/m$^3$ (110 Btu/scf), about 5,516 kJ/m$^3$ (140 Btu/scf), or about 6,707 kJ/m$^3$ (180 Btu/scf) to a high of about 7,452 kJ/m$^3$ (200 Btu/scf), about 9,315 kJ/m$^3$ (250 Btu/scf), about 10,264 kJ/m$^3$ (275 Btu/scf), about 11,178 kJ/m$^3$ (300 Btu/scf), about 13,041 kJ/m$^3$ (350 Btu/scf), or about 14,904 kJ/m$^3$ (400 Btu/scf).

Figure 2:
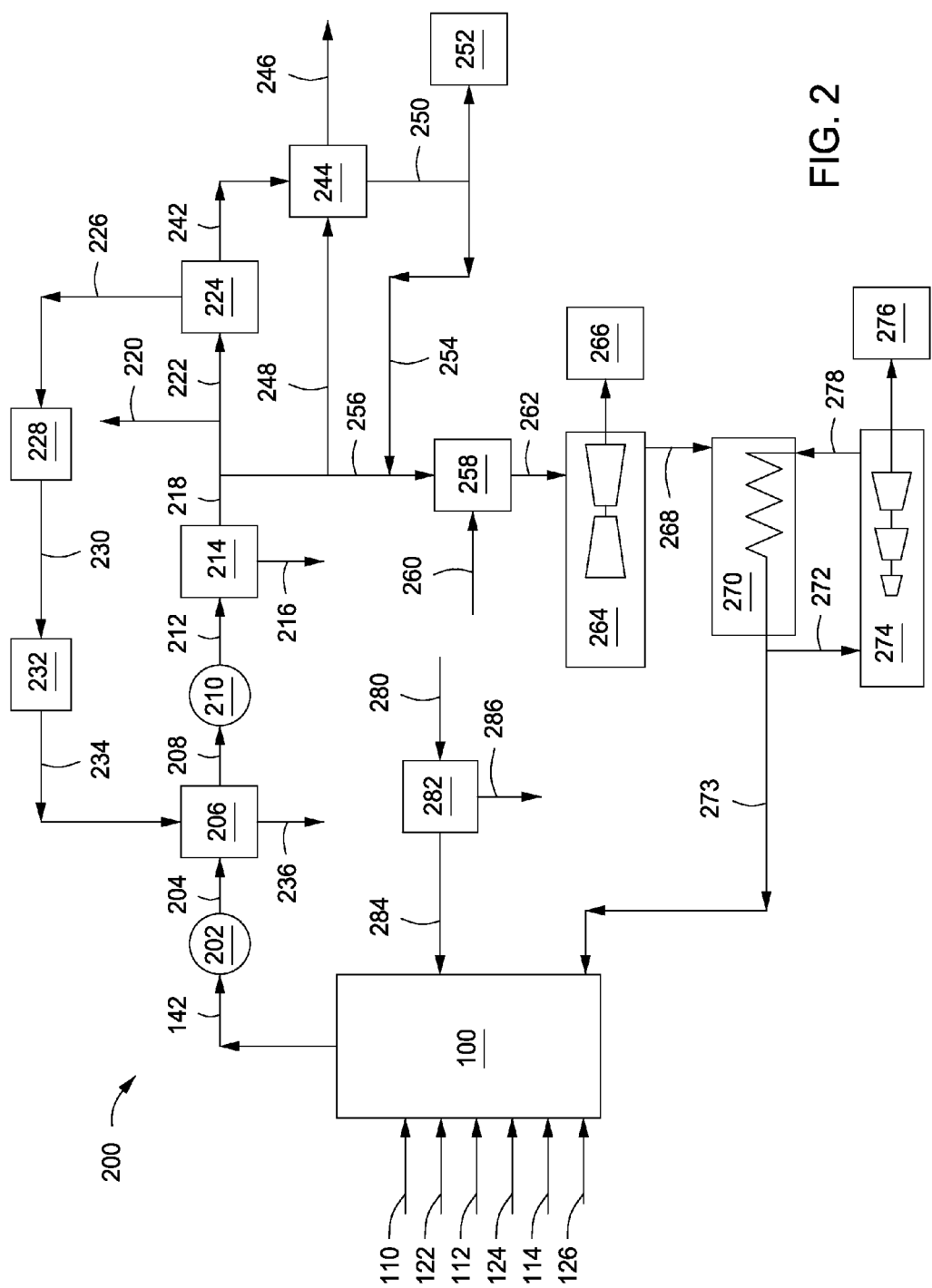
FIG. 2 depicts an illustrative gasification system, according to one or more embodiments described.

FIG. 2 depicts an illustrative gasification system 200, according to one or more embodiments. The gasification system 200 can include one or more gasifiers 100, particulate removal systems 206, and gas purification systems 214 to produce a treated synthesis gas ("syngas") via line 218 that includes about 85% or more of combined carbon monoxide and hydrogen with the balance being primarily carbon dioxide and methane. The gasification system 200 can also include one or more gas converters 224, hydrogen separators 244, fuel cells 252, combustors 258, gas turbines 264, waste heat boilers 270, steam turbines 274, generators (two are shown 266 and 276), and air separation units ("ASU") 282.

The syngas or raw syngas via line 142 from the gasifier 100 can be cooled within a cooler 202 ("primary cooler") to provide a cooled raw syngas via line 204 prior to introduction to the particulate removal system 206. For example, the raw syngas via line 142 can be cooled to about 550° C. or less, about 450° C. or less, about 350° C. or less, about 250° C. or less, or about 150° C. or less. In at least one embodiment, the raw syngas via line 142 can bypass the cooler 202 and be introduced directly to the particulate removal system 206, resulting in hot gas particulate removal at a temperature of about 550° C. to about 1,050° C.

The particulate removal system 206 can be used to partially or completely remove any remaining particulates from raw syngas via line 142 to provide particulates via line 236 and a separated syngas via line 208. The particulate removal system 206 can include one or more separation devices, for example conventional disengagers and/or cyclones (not shown). Particulate control devices ("PCD") capable of providing an outlet particulate concentration below the detectable limit of about 0.1 parts per million by weight (ppmw) can also be used. Examples of suitable illustrative PCDs include, but are not limited to, sintered metal filters, metal filter candles, and/or ceramic filter candles (for example, iron aluminide filter material).

The solid particulates via line 236 can be recycled (not shown) to the gasifier 100 or purged from the system, as shown. The separated syngas via line 208 can be cooled using one or more coolers 210 ("secondary cooler") to provide a cooled, separated syngas via line 212. The cooled, separated syngas via line 212 can have a temperature of about 350° C. or less, for example about 150° C. to about 250° C.

The cooled, separated syngas via line 212 can be treated within the gas purification system 214 to remove contaminants and to provide a waste gas via line 216 and a treated syngas via line 218. The gas purification system 214 can include any system, process, and/or device capable of removing at least a portion of any sulfur and/or sulfur-containing compounds contained in the cooled, separated syngas in line 212. For example, the gas purification system 214 can include a catalytic gas purification system that can include, but is not limited to, catalytic systems using zinc titanate, zinc ferrite, tin oxide, zinc oxide, iron oxide, copper oxide, cerium oxide, or mixtures thereof. In another example, the gas purification system 214 can include a process-based gas purification system that can include, but is not limited to, the Selexol™ process, the Rectisol® process, the CrystaSulf® process, and the Sulfinol® Gas Treatment Process.

The gas purification system 214 can use an amine solvent such as methyl-diethanolamine (MDEA) to remove acid gas from the cooled, separated syngas via line 212. Physical solvents, for example Selexol™ (dimethyl ethers of polyethylene glycol) or Rectisol® (cold methanol), can also be used. If the cooled, separated syngas via line 212 contains carbonyl sulfide (COS), the carbonyl sulfide can be converted by hydrolysis to hydrogen sulfide by reaction with water over a catalyst and then absorbed using the methods described above. If the cooled, separated syngas via line 212 contains mercury, the mercury can be removed using a bed of sulfur-impregnated activated carbon.

A cobalt-molybdenum ("Co—Mo") catalyst can be incorporated into the gas purification system 214 to perform a sour shift conversion of the syngas. The Co—Mo catalyst can operate at a temperature of about 550° F. in presence of $H_{2S}$, for example, about 100 ppmw $H_2S$. If a Co—Mo catalyst is used to perform a sour shift, subsequent downstream removal of sulfur can be accomplished using any of the above described sulfur removal methods and/or techniques.

At least a portion of the treated syngas in line 218 can be removed from the system via line 220 and sold as a commodity. At least a portion of the treated syngas in line 218 can be introduced via line 222 to the gas converter 224. The gas converter 224 can include a shift reactor (not shown) to adjust the hydrogen ($H_2$) to carbon monoxide (CO) ratio ($H_2$:CO) of the synthesis gas by converting CO to carbon dioxide ($CO_2$). Within the shift reactor, a water-gas shift reaction can react at least a portion of the carbon monoxide in the treated syngas via line 222 with water in the presence of a catalyst and a high temperature to produce hydrogen and carbon dioxide. Examples of suitable shift reactors can include, but are not limited to, single stage adiabatic fixed bed reactors, multiple-stage adiabatic fixed bed reactors with interstage cooling, steam generation or cold quench reactors, tubular fixed bed reactors with steam generation or cooling, fluidized bed reactors, or any combination thereof. A sorption, e.g., an absorption and/or adsorption, enhanced water-gas shift (SEWGS) process can be used. For example, a pressure swing adsorption unit having multiple fixed bed reactors packed with shift catalyst and at high temperature, e.g., a carbon dioxide adsorbent at about 480° C., can be used. Various shift catalysts can be employed.

The shift reactor can include two reactors arranged in series. A first reactor can be operated at high temperature (about 350° C. to about 400° C.) to convert a majority of the CO present in the treated syngas via line 222 to $CO_2$ at a relatively high reaction rate using an iron-chrome catalyst. A second reactor can be operated at a relatively low temperature (about 150° C. to about 200° C.) to complete the conversion of CO to $CO_2$ using a mixture of copper oxide and zinc oxide.

The recovered carbon dioxide via line 226 from the shift reactor can be introduced to a compression and liquefaction unit 228. The compression and liquefaction unit 228 can include one or more compressors, such as centrifugal compressors, configured to compress the $CO_2$. The compressed $CO_2$ can have a pressure ranging from a low of about 8,000 kPa, about 10,000, kPa, or about 12,000 kPa to a high of about 17,000 kPa, about 20,000 kPa, or about 23,000 kPa. For example, the compressed $CO_2$ can have a pressure ranging from about 8,000 kPa to about 20,000 kPa, about 10,000, kPa to about 17,000 kPa, or about 12,000 kPa to about 15,000 kPa. The compressed $CO_2$ can also be cooled to a temperature ranging from a low of about 0° C., about 5° C., or about 10° C. to a high of about 60° C., about 70° C., or about 80° C. For example, the cooled, compressed $CO_2$ can have a temperature from about 0° C. to about 80° C., about 10° C. to about 60° C., about 20° C. to about 50° C., or about 30° C. to about 40° C. The cooled, compressed $CO_2$ can exit the compression and liquefaction unit 228 as a liquid or liquid-gas mixture via line 230. The $CO_2$ via line 230 can be stored in a $CO_2$ storage unit 232 in liquid form. During start-up and upset conditions of the gasification system 200, the liquid $CO_2$ in the storage unit 232 can be introduced to the particulate removal system 206 via line 234. As the $CO_2$ contains negligible amounts of oxygen, it can be recycled through one or more hot gas filters in particulate removal system 206 to act as a fire inhibitor and extinguisher. The $CO_2$ can provide cooling to the syngas flowing therethrough and will not be left as a liquid in the system. The $CO_2$ can exit the particulate removal system 206 via line 236 with the removed particulates.

Returning to the gas converter 224, at least a portion of the converted gas via line 242 can be sold or upgraded using further downstream processes (not shown). At least a portion of converted gas via line 242 can be directed to the hydrogen separator 244. At least a portion of treated syngas in line 218 can bypass the gas converter 224 described above and can be introduced via line 248 directly to hydrogen separator 244. Although not shown in FIG. 2, carbon dioxide can be separated and/or recovered from the converted gas via line 242 via physical adsorption techniques. Examples of suitable adsorbents and techniques include, but are not limited to, propylene carbonate physical adsorbent solvent as well as other alkyl carbonates, dimethyl ethers of polyethylene glycol of two to twelve glycol units (Selexol™ process), n-methyl-pyrrolidone, sulfolane, and use of the Sulfinol® Gas Treatment Process.

The hydrogen separator 244 can include any system or device to selectively separate hydrogen from syngas to provide purified hydrogen and a waste gas. The hydrogen separator 244 can utilize pressure swing absorption, cryogenic distillation, and/or semi-permeable membranes. Examples of suitable absorbents include, but are not limited to, caustic soda, potassium carbonate or other inorganic bases, alkanes, and/or alkanolamines. The hydrogen separator 244 can provide a carbon dioxide rich fluid via line 246 and a hydrogen rich fluid via line 250. At least a portion of hydrogen rich fluid via line 250 can be used as a feed to a fuel cell 252.

In one embodiment, at least a portion of hydrogen rich fluid via line 254 can be combined with the treated syngas via line 256 to use as a fuel in the combustor 258. The combustor 258 can be configured to provide a high pressure/high temperature exhaust gas via line 262. The high pressure/high temperature exhaust gas via line 262 can be introduced to the gas turbine 264 to provide mechanical shaft power to drive an electric generator 266 and an exhaust gas via line 268. The exhaust gas via line 268 can be introduced to the waste heat boiler or heat recovery system 270 to provide steam via lines 272, 273. The steam via line 272 can be introduced to a steam turbine 274 to provide mechanical shaft power to drive the generator 276. The steam via line 273 can be introduced to the gasifier 100, and/or other auxiliary process equipment. Lower pressure steam from steam turbine 274 can be recycled to heat recovery system 270 via line 278.

Essentially oxygen produced from the air separation unit ("ASU") 282 can be supplied to gasifier 100. For example, up to about 10 vol %, up to about 20 vol %, up to about 30 vol %, up to about 40 vol %, or up to about 50 vol % of the total oxidant fed to gasifier 100 can be supplied by ASU 282 via line 284. The ASU 282 can provide a nitrogen-lean and oxygen-rich fluid via line 284 to gasifier 100, thereby minimizing the nitrogen concentration in the system. The use of essentially oxygen allows gasifier 100 to produce raw syngas via line 142 that is essentially nitrogen-free, for example, containing less than 0.5% nitrogen/argon. The ASU 282 can be a high-pressure, cryogenic type separator that can be supplemented with air via line 280. A reject nitrogen via line 286 from ASU 282 can be added to a combustion turbine or used as utility.

Embodiments described herein further relate to any one or more of the following paragraphs:

1. A method for gasifying a feedstock, comprising: introducing the feedstock to a riser; introducing a first oxidant to a first mixing zone within the riser, thereby generating a first high temperature zone within the first mixing zone proximate an entry point of the first oxidant; introducing a first stream of water to the first high temperature zone to reduce the temperature therein; introducing a second oxidant to a second mixing zone within the riser, thereby generating a second high temperature zone within the second mixing zone proximate an entry point of the second oxidant; introducing a second stream of water to the second high temperature zone to reduce the temperature therein; and gasifying the feedstock and the first and second oxidants in a gasification zone within the riser.

2. The method of paragraph 1, wherein the first stream of water is at a temperature of about 90° C. and about 120° C.

3. The method of paragraph 1 or 2, wherein the first stream of water is at a pressure of about 3,900 kPa and about 4,500 kPa.

4. The method according to any one of paragraphs 1 to 3, wherein the first high temperature zone is at a temperature of about 1,050° C. and about 1,250° C.

5. The method according to any one of paragraphs 1 to 4, wherein the second high temperature zone is at a temperature of about 900° C. and about 1,200° C.

6. The method of paragraph 1, wherein the first oxidant is introduced at a rate of about 12,000 kg/hr and about 50,000 kg/hr, and wherein the first stream of water is introduced at a rate of about 5,000 kg/hr and about 10,000 kg/hr.

7. The method of paragraph 6, wherein the second oxidant is introduced at a rate of about 12,000 kg/hr and about 50,000 kg/hr, and wherein the second stream of water is introduced at a rate of about 2,000 kg/hr and about 5,000 kg/hr.

8. The method according to any one of paragraphs 1 to 7, wherein the first oxidant and the first stream of water are introduced separately into the first mixing zone, combined prior to being introduced into the first mixing zone, or a combination thereof.

9. The method according to any one of paragraphs 1 to 8, wherein generating the first high temperature zone comprises combusting carbon-containing particulates circulating therethrough.

10. A method for gasifying a feedstock, comprising: introducing the feedstock to a riser; introducing a first oxidant to the riser, thereby generating a first high temperature zone within the riser proximate an entry point of the first oxidant; introducing a first stream of water to the first high temperature zone to reduce the temperature therein; converting the feedstock and the first oxidant into a mixture including syngas and particulates within the riser; separating the mixture into a first syngas stream and a first particulate stream within a first cyclone, wherein the first syngas stream includes remaining particulates; transferring the first particulate stream from the first cyclone to a standpipe; separating the first syngas stream into a second syngas stream and a remaining particulate stream within a second cyclone; transferring the remaining particulate stream from the second cyclone to the standpipe; and recycling the particulates from the standpipe to the riser through a recycle line.

11. The method of paragraph 10, further comprising: introducing a second oxidant to the riser, thereby generating a second high temperature zone within the riser proximate an entry point of the second oxidant; and introducing a second stream of water to the second high temperature zone to reduce the temperature in the second high temperature zone.

12. The method according to paragraph 10 or 11, wherein the first stream of water comprises boiler feed water.

13. The method according to any one of paragraphs 10 to 12, wherein the first stream of water is at a temperature of about 90° C. and about 120° C.

14. The method according to any one of paragraphs 10 to 13, wherein the first stream of water is in a liquid state.

15. The method according to any one of paragraphs 10 to 14, further comprising: removing additional particulates from the second syngas stream with a particulate removal system; removing carbon dioxide from the second syngas stream with a gas converter; and recycling the removed carbon dioxide through a filter in the particulate removal system.

16. A system for gasifying a feedstock, comprising: a riser configured to receive and convert the feedstock, an oxidant, and water into a mixture comprising syngas and particulates, wherein the oxidant generates a high temperature zone within the riser proximate an entry point of the oxidant, and wherein the water is introduced to the high temperature zone to reduce the temperature therein; a first cyclone fluidly coupled to the riser and configured to separate the mixture into a first syngas stream and a first particulate stream, wherein the first syngas stream includes remaining particulates; a second cyclone fluidly coupled to the first cyclone and configured to separate the first syngas stream into a second syngas stream and a remaining particulate stream; a standpipe fluidly coupled to the first and second cyclones and configured to receive the first particulate stream and the remaining particulate stream; and a recycle line fluidly coupled to the standpipe and the riser and configured to transfer the particulates from the standpipe to the riser.

17. The system of paragraph 16, further comprising a particulate removal system fluidly coupled to the second cyclone and configured to remove additional particulates from the second syngas stream.

18. The system of paragraph 17, further comprising a gas converter fluidly coupled to the particulate removal system and configured to remove carbon dioxide from the second syngas stream.

19. The system of paragraph 18, further comprising a compression and liquefaction unit fluidly coupled to the gas converter and configured to liquefy the removed carbon dioxide.

20. The system of paragraph 19, further comprising a carbon dioxide storage unit fluidly coupled to the compression and liquefaction unit and configured to transfer the removed carbon dioxide to a filter in the particulate removal system.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for gasifying a feedstock, comprising:
    introducing a feedstock to a riser;
    introducing a first oxidant to a first mixing zone within the riser, thereby generating a first high temperature zone within the first mixing zone proximate an entry point of the first oxidant, wherein the first high temperature zone is at a temperature of about 1,050° C. to about 1,250° C.;
    introducing a first stream of water to the first high temperature zone to reduce the temperature therein;
    introducing a second oxidant to a second mixing zone within the riser, thereby generating a second high temperature zone within the second mixing zone proximate an entry point of the second oxidant;
    introducing a second stream of water to the second high temperature zone to reduce the temperature therein; and
    gasifying the feedstock and the first and second oxidants in a gasification zone within the riser.

2. The method of claim 1, wherein the first stream of water is at a temperature of about 90° C. to about 120° C.

3. The method of claim 1, wherein the first stream of water is at a pressure of 3,900 kPa to about 4,500 kPa.

4. The method of claim 1, wherein a weight ratio of the feedstock to the first oxidant introduced to the riser is from about 0.6:1 to about 16.7:1.

5. The method of claim 1, wherein the second high temperature zone is at a temperature of about 900° C. to about 1,200° C.

6. The method of claim 1, wherein the first oxidant is introduced at a rate of about 12,000 kg/hr to about 50,000 kg/hr, and wherein the first stream of water is introduced at a rate of about 5,000 kg/hr to about 10,000 kg/hr.

7. The method of claim 6, wherein the second oxidant is introduced at a rate of about 12,000 kg/hr to about 50,000 kg/hr, and wherein the second stream of water is introduced at a rate of about 2,000 kg/hr to about 5,000 kg/hr.

8. The method of claim 1, wherein the first oxidant and the first stream of water are introduced separately into the first mixing zone, combined prior to being introduced into the first mixing zone, or a combination thereof.

9. The method of claim 1, wherein generating the first high temperature zone comprises combusting carbon-containing particulates circulating therethrough.

* * * * *